(12) United States Patent
Yamashita et al.

(10) Patent No.: US 10,700,741 B2
(45) Date of Patent: Jun. 30, 2020

(54) ELECTRONIC CONTROL APPARATUS PROVIDED WITH POWER LINE COMMUNICATION FUNCTION, ACTUATOR, ELECTRONIC CONTROL SYSTEM, AND AUTOMOBILE USING SAME

(71) Applicant: HITACHI AUTOMOTIVE SYSTEMS, LTD., Ibaraki (JP)

(72) Inventors: Hiroki Yamashita, Tokyo (JP); Taizo Yamawaki, Tokyo (JP); Hidehiro Toyoda, Tokyo (JP); Teppei Hirotsu, Tokyo (JP); Ryosuke Ishida, Hitachinaka (JP); Hirofumi Kurimoto, Hitachinaka (JP); Kenichi Hoshino, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 16/322,383

(22) PCT Filed: Jul. 6, 2017

(86) PCT No.: PCT/JP2017/024858
§ 371 (c)(1),
(2) Date: Jan. 31, 2019

(87) PCT Pub. No.: WO2018/025573
PCT Pub. Date: Feb. 8, 2018

(65) Prior Publication Data
US 2020/0059264 A1    Feb. 20, 2020

(30) Foreign Application Priority Data

Aug. 4, 2016 (JP) .................................. 2016-153810

(51) Int. Cl.
*H04B 3/54* (2006.01)
*B60R 16/023* (2006.01)
(Continued)

(52) U.S. Cl.
CPC ............. *H04B 3/54* (2013.01); *B60R 16/023* (2013.01); *H04B 3/04* (2013.01); *H04L 25/02* (2013.01);
(Continued)

(58) Field of Classification Search
CPC .......... H04B 3/54; H04B 3/04; B60R 16/023; H04L 25/02
See application file for complete search history.

(56) References Cited

U.S. PATENT DOCUMENTS 5,787,132 A * 7/1998 Kishigami .............. H04L 7/042
370/304
2010/0070141 A1  3/2010 Tanaka et al.
(Continued)

FOREIGN PATENT DOCUMENTS

JP  2002-261663 A   9/2002
JP  2005-277666 A   10/2005
(Continued)

OTHER PUBLICATIONS

International Search Report for PCT/JP2017/024858 A1, dated Sep. 19, 2017.

*Primary Examiner* — Curtis B Odom
(74) *Attorney, Agent, or Firm* — Volpe and Koenig, P.C.

(57) ABSTRACT

A correct commutation is realized even if a communication error occurs due to a change in an actuator drive current. An electronic control unit that includes a communication section outputting a control signal and that can transmit the control signal to an actuator connected to the electronic control unit via a power line, includes an actuator operation
(Continued)

detection section. When the actuator operation detection section detects an actuator operation, the communication section retransmits the control signal at timing of detecting the actuator operation.

11 Claims, 15 Drawing Sheets

(51) Int. Cl.
    *H04B 3/04*         (2006.01)
    *H04L 25/02*      (2006.01)
    *H04L 29/02*      (2006.01)

(52) U.S. Cl.
    CPC ........ *H04L 29/02* (2013.01); *H04B 2203/547* (2013.01); *H04B 2203/5445* (2013.01)

(56) References Cited

U.S. PATENT DOCUMENTS

2010/0329320 A1   12/2010   Umehara et al.
2013/0195208 A1    8/2013   Umehara et al.

FOREIGN PATENT DOCUMENTS

| JP | 2010-081340 A | 4/2010 |
| JP | 2011-135555 A | 7/2011 |
| JP | 2012-109943 A | 6/2012 |

* cited by examiner

ELECTRONIC CONTROL APPARATUS PROVIDED WITH POWER LINE COMMUNICATION FUNCTION, ACTUATOR, ELECTRONIC CONTROL SYSTEM, AND AUTOMOBILE USING SAME

TECHNICAL FIELD

The present invention relates to an electronic control unit, an actuator, and an electronic control system each equipped with a power line communication function using a power line for a direct-current power supply.

BACKGROUND ART

In recent years, with enhanced accuracy and advanced functionality for vehicle control by an electronic control unit (ECU), many sensors and actuators are provided for the acquisition of various vehicle information (including vehicle surrounding information) and control over vehicular sections, and the number of communication lines between these sensors and actuators and the ECU has considerably increased in an automobile. Against this backdrop, Patent Document 1 discloses the application of a power line communication device using a power line for a direct-current power supply as a communication line for communicating vehicle information sensor data and control data. According to Patent Document 1, a communication phase and a power feeding phase are provided for the use of the power line and the power line is used for either communication or power feeding per phase.

PRIOR ART DOCUMENT

Patent Document

Patent Document 1: JP-2010-81340-A
Patent Document 2: JP-2002-261663-A

SUMMARY OF THE INVENTION

Problem to be Solved by the Invention

In Patent Document 1, the communication phase and the power feeding phase are provided for the use of the power line so that the communication is free from the influence of the power feeding. However, it is often impermissible to interrupt the power feeding from the direct-current power supply used to drive the actuators to correspond to the power feeding phase. For example, in a case of using a PWM (Pulse Width Modulation)-controlled solenoid coil or motor as an actuator, it is impossible to interrupt the power feeding from the direct-current power supply. Interrupting the power feeding results in a failure to realize desired control by the actuator. In the case of the PWM-controlled actuator, it is necessary to supply a mean current of PWM-controlled currents to the actuator as a desired drive current; however, interrupting the power feeding makes it difficult to control the current supplied to the actuator to the desired drive current.

Meanwhile, since a current in the power line varies with the influence of a change in the current that drives the actuator, the variation causes an error in the communication using the power line. To address the problem, there has been conventionally adopted a method, as described in Patent Document 2, including transmitting, by a slave station, a data retransmission request to a control station, that is, an ECU when a sensor or an actuator in the slave station detects a communication error, and retransmitting, by the ECU, data. However, the actuator is PWM controlled irrespective of the communication even during the communication for the slave station to transmit the retransmission request; thus, the change in the current driving the actuator possibly occurs. Owing to this, problems occur that the retransmission request is not correctly transmitted to the ECU, and the ECU is unable to retransmit data to the slave station, with the result that it is difficult to establish a correct communication.

Therefore, an object of the present invention is to realize a correct communication even when a communication error occurs due to a change in a current driving an actuator.

Solution to Problem

To attain the object, an "electronic control unit" of the present invention, for example, is an electronic control unit that includes a communication section outputting a control signal and that can transmit the control signal to an actuator connected to the electronic control unit via a power line, the electronic control unit including an actuator operation detection section, in which when the actuator operation detection section detects an actuator operation, the communication section retransmits the control signal at timing of detecting the actuator operation.

Furthermore, an "actuator" of the present invention, for example, is an actuator that includes a communication section receiving a control signal and that can receive the control signal from an electronic control unit connected to the actuator via a power line, the actuator including an actuator operation detection circuit, in which when the actuator operation detection circuit detects an actuator operation, the communication section selects and outputs the control signal retransmitted from the electronic control unit on the basis of an actuator operation detection signal.

Moreover, an "electronic control system" of the present invention, for example, is an electronic control system including: an electronic control unit; one or a plurality of actuators; and a power line that connects the electronic control unit to the one or the plurality of actuators, and transmitting a control signal from the electronic control unit to the one or the plurality of actuators via the power line, in which a communication section in the electronic control unit includes an actuator operation detection circuit, and retransmits the control signal at timing of detecting an actuator operation when the actuator operation detection circuit detects the actuator operation, and a communication section in each of the one or the plurality of actuators outputs the control signal retransmitted from the electronic control unit.

Effect of the Invention

According to the electronic control unit and the electronic control system each having the power line communication function of the present invention, even if a communication error due to a change in a drive current driving the actuator occurs in circumstances in which it is impossible to interrupt power feeding from a direct-current power supply to a power line to correspond to a power feeding phase, it is possible to realize a correct communication by receiving the data retransmitted after the time of the change.

MODES FOR CARRYING OUT THE INVENTION

As an implementation of the present invention, an electronic control system with a power line communication function will be disclosed while referring to several embodiments. The electronic control system is configured such that means for detecting time of a change in a drive current driving an actuator (note that this change will be defined as "actuator operation" in the following description) is provided in an electronic control unit (ECU) and such that a communication block that retransmits control data, which is transmitted from the ECU to a sensor or the actuator at the detected time, after the detected time is provided.

This configuration can realize a correct communication by, even if a communication error due to the change in the drive current driving the actuator occurs in circumstances in which it is impossible to interrupt power feeding from a direct-current power supply to a power line to correspond to a power feeding phase, receiving the data retransmitted after the time of the change.

While a term "block" is used in the description of the implementation to avoid complication of terms accompanying a nesting configuration such that a certain circuit includes another circuit as much as possible, the use of the term has no other intentions.

First Embodiment

Figure 1:
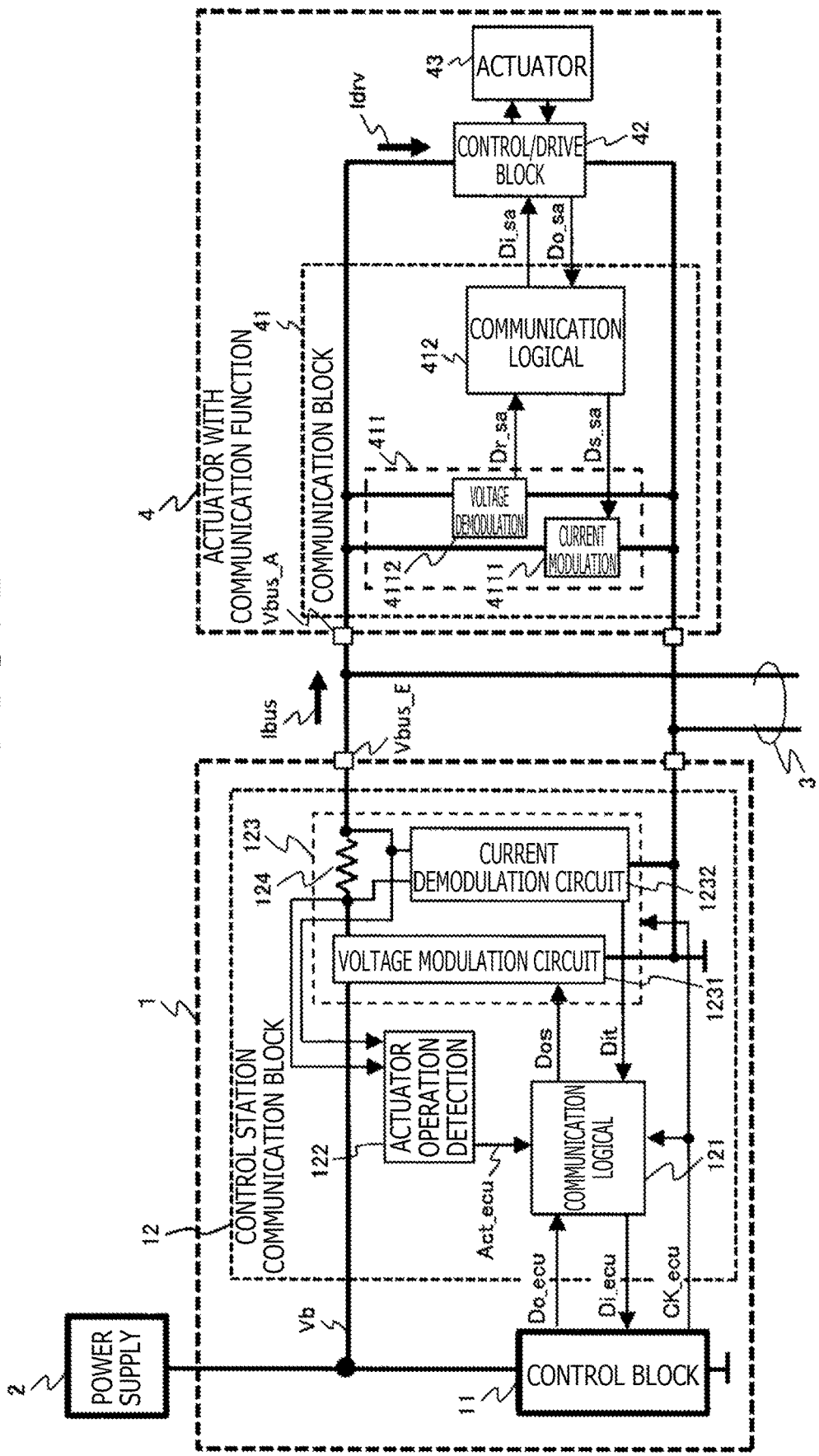
FIG. 1 illustrates an electronic control system with a power line communication function according to a first embodiment of the present invention.

FIG. 1 illustrates an example of a configuration of an electronic control system with a power line communication device according to a first embodiment of the present invention. The electronic control system has an electronic control unit (ECU) 1, a power supply (direct-current power supply) 2, a power line bus 3, and an actuator 4 with a communication function. The ECU 1 and an actuator 43 hold a communication via a power line communication device configured with a control station communication block 12 in the ECU 1 and a communication block 41 in the actuator 4 with the communication function. The control station communication block 12 has a communication logical block 121, an actuator operation detection circuit 122, a modulation/demodulation block 123, and a power line current monitor resistor 124, and each block operates on the basis of a communication clock CK_ecu from the ECU 1. The communication logical block 121 interfaces with the ECU 1, and performs coding/decoding of and communication error detection on communication data about the communication with the actuator 4. In addition, the communication logical block 121 performs an error correction based on an actuator operation detection signal Act_ecu. The actuator operation detection circuit 122 detects an actuator operation from a change in a voltage across the power line current monitor resistor 124, and outputs the detected actuator operation, as the signal Act_ecu, to the communication logical block 121. In an operation for transmitting control data Do_ecu from the ECU 1 to the actuator 4 with the communication function, the communication logical block 121 adds an address of a destination, that is, an address of the actuator 4 with the communication function, communication error data, and the like to the control data Do_ecu, performs a coding process on the control data, and outputs the coded control data to the modulation/demodulation block 123 as transmission data Dos. At this time, if the actuator operation detection signal Act_ecu is detected, the communication logical block 121 also adds transmission data at time of detection of the actuator operation detection signal Act_ecu to the control data Do_ecu, and outputs resultant transmission data to the modulation/demodulation block 123 as the signal Dos. The modulation/demodulation block 123 has a voltage modulation circuit 1231 and a current demodulation circuit 1232. This input signal Dos is input to the voltage modulation circuit 1231, and the voltage modulation circuit 1231 converts the signal Dos into a voltage signal, superimposes this voltage signal on a voltage of the power line bus 3. The modulation/demodulation block 123 thereby transmits the control data to the communication block 41 in the actuator 4 with the communication function. Furthermore, in an operation for receiving, by the ECU 1, data Di_ecu from the actuator 4 with the communication function, a current Ibus of the power line bus 3 on which a signal current sent from the actuator 4 with the communication function runs through the power line current monitor resistor 124. A potential difference proportional to the signal current is thereby generated across this resistor 124. The current demodulation circuit 1232 converts this potential difference into a voltage signal and outputs the voltage signal to the communication logical block 121 as a signal Dit. This signal Dit is input to the communication logical block 121, and the communication logical block 121 receives the actuator operation detection signal Act_ecu, extracts retransmission data from the signal Dit, corrects a communication error with the reproduced data, performs a decoding process after the correction, and outputs resultant data as the control data Di_ecu to the ECU 1.

Although not illustrated, if the communication between the ECU 1 and the actuator 4 with the communication function is established in a message response form in which the actuator 4 with the communication function responds to a message (transmission data) from the ECU 1 to the actuator 4 with the communication function, the actuator 4 with the communication function does not transmit a response while the ECU 1 is transmitting the message. Preferably, therefore, the ECU 1 exercises control such that the current demodulation circuit 1232 does not operate while the ECU 1 is transmitting the message.

On the other hand, the actuator 4 with the communication function has the communication block 41, a control/drive block 42, and the actuator 43. The communication block 41 has a modulation/demodulation block 411 and a communication logical block 412. The modulation/demodulation block 411 has a current modulation circuit 4111 that converts transmission data (actuator state data) Ds_sa from the control/drive block 42 toward the ECU 1 into a current signal, and a voltage demodulation circuit 4112 that demodulates data Dr_sa from the voltage signal of the power line bus 3. The communication logical block 412 interfaces with the control/drive block 42, and performs coding/decoding of and communication error detection of communication data about the communication with the control station communication block 12. In addition, the communication logical block 412 performs addition of the retransmission data and an error correction on the received data Dr_sa. The control/drive block 42 controls/drives an operation of the actuator 43 with an output signal Di_sa from the communication logical block 412, and outputs data such as operation states of the control/drive block 42 and the actuator 43 to the communication logical block 412 as a signal Do_sa.

In a transmitting operation from the actuator 4 with the communication function to the control station communication block 12, the communication logical block 412 performs a coding process on the transmission data Do_sa such as the state information about the actuator 43 from the control/drive block 42 while containing the address of the actuator 4 with the communication function, an error detection code, and the like, and outputs the resultant coded data to the modulation/demodulation block 411 as the signal Ds_sa. The current modulation circuit 4111 in the modulate/demodulation block 411 converts this signal Ds_sa into the current signal and superimposes the current signal on the power line bus current Ibus, thereby transmitting data toward the control station communication block 12 as the current signal. Furthermore, in a receiving operation from the control station communication block 12 to the actuator 4 with the communication function, the voltage demodulation circuit 4112 demodulates the voltage signal modulated by the voltage modulation circuit 1231 in the control station communication block 12 and superimposed on the power line bus 3 into the voltage signal Dr_sa, and outputs the voltage signal Dr_sa to the communication logical block 412. This receive signal Dr_sa is input to the communication logical block 412, and the communication logical block 412 determines whether a communication error is present by the error detection code or the like. If the communication error is present, the communication logical block 412 performs a decoding process after correcting the communication error with the retransmission data contained in the receive signal Dr_sa, and outputs the resultant signal to the control/drive block 42 as the output signal Di_sa.

Figure 2:
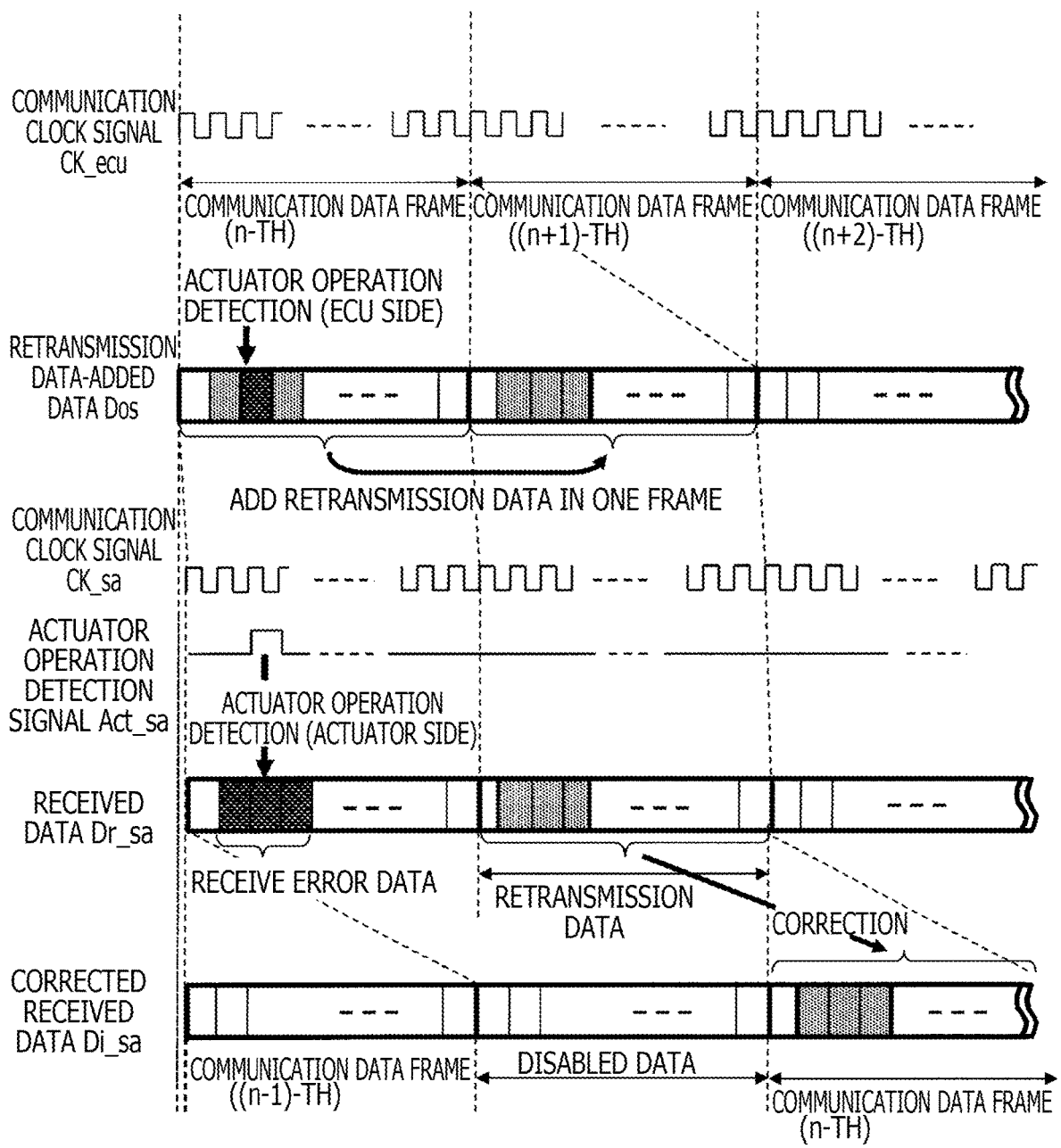
FIG. 2 illustrates a transmission/received data flow representing a retransmission operation according to the first embodiment.

FIG. 2 illustrates a data flow representing a data transmission operation and an error correction operation in a case of occurrence of the communication error during a transmission operation from the control station communication block 12 to the actuator 4 with the communication function in the electronic control system with the power line communication device according to the present embodiment. FIG. 2 illustrates a transmission/received data flow of occurrence of the change in the drive circuit driving the actuator 43 during a power line communication between the actuator 4 with the communication function and the control station communication block 12, and correction of the change with the retransmission data. When the actuator operation detection circuit 122 in the control station communication block 12 detects the actuator operation during output of data of an n-th communication frame, the communication logical block 121 in the control station communication block 12 re-outputs the same data as that in the n-th communication frame to the modulation/demodulation block 123 in a next (n+1)-th communication frame. This data is modulated into the voltage signal by the voltage modulation circuit 1231 and the voltage signal is sent to the power line bus 3.

On the other hand, in the actuator 4 with the communication function, the voltage demodulation circuit 4112 demodulates the voltage change superimposed on the power line bus 3 and modulated as the transmission data into the receive signal Dr_sa and outputs the receive signal Dr_sa to the communication logical block 412. The communication logical block 412 performs a decoding process on this signal Dr_sa, and extracts an address signal indicating the address of the actuator 4 with the communication function, a control signal, and a communication error detection signal. If a communication error is detected, the communication logical block 412 disables the data of the nth communication frame, and outputs the (n+1)-th data to the control/drive block 42 as the received data Di_sa. As a result, disabling the received data at timing of confirming the communication error causes the actuator 4 with the communication function to receive the retransmitted communication frame data, thus always ensuring error correction.

According to the present embodiment, it is possible to realize a communication using the power line in circumstances of continuing the power feeding from the direct-current power supply to the power line. Specifically, even if a communication error occurs due to the change in the drive current driving the actuator 43, the control station commutation block 12 can detect the change and identifies a communication error location; thus, it is possible to retransmit data before or after time of the error. As a result, the communication error can be corrected using this retransmission data and no communication error occurs in the communication between the actuator 4 with the communication function and the control station communication block 12 in the power line communication device. Furthermore, an error detection function of the communication logical block 412 disables error data and receives the retransmission data; thus, it is unnecessary to provide an actuator operation detection circuit in the actuator to simplify a configuration of the system.

Second Embodiment

Figure 3:
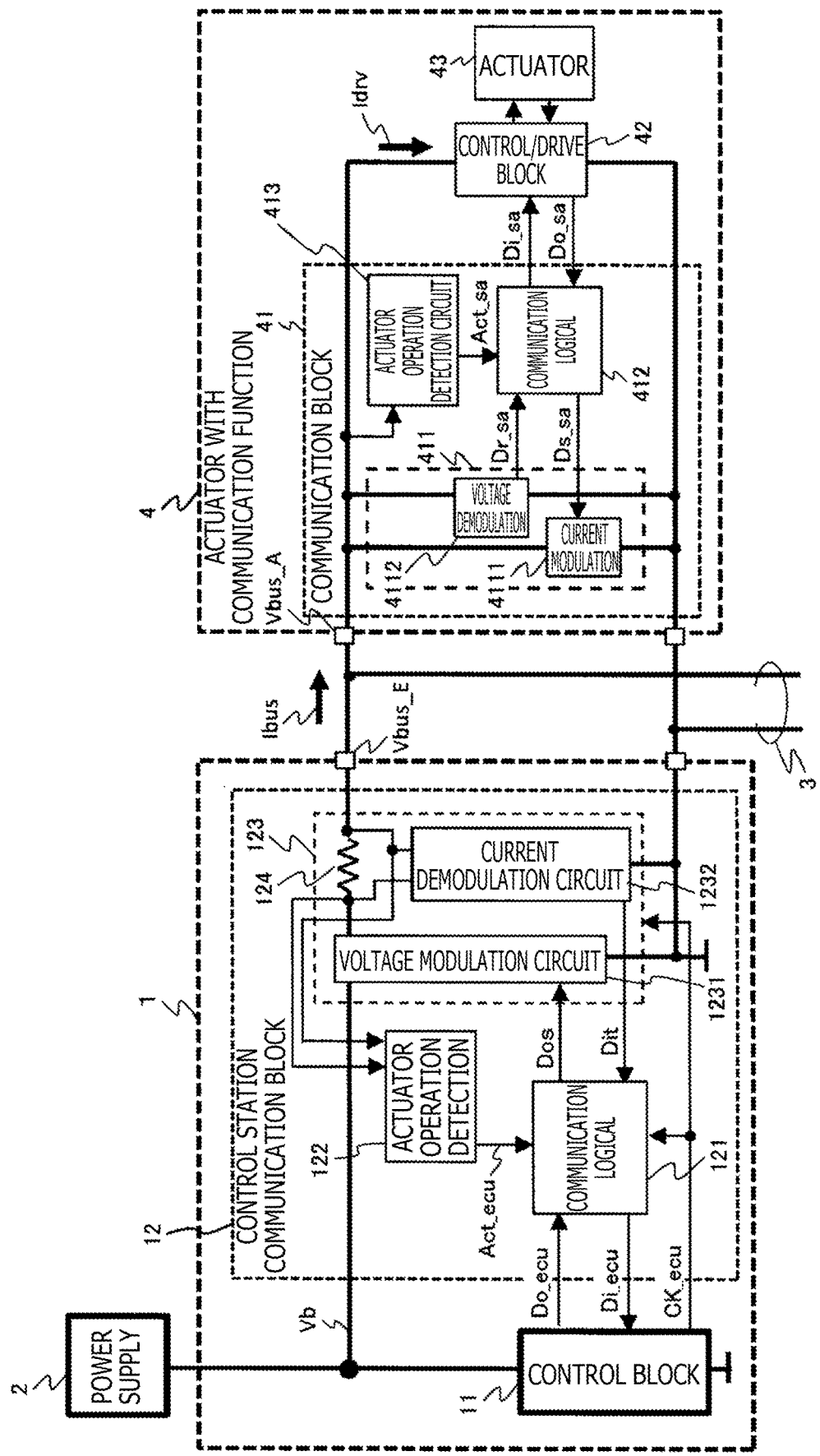
FIG. 3 illustrates an electronic control system with a power line communication function according to a second embodiment of the present invention.

FIG. 3 illustrates an example of an electronic control system with a power line communication device according to a second embodiment of the present invention. Similarly to the embodiment of FIG. 1, the electronic control system according to the present embodiment has the electronic control unit (ECU) 1, the power supply 2, the power line bus 3, and the actuator 4 with the communication function. In the present embodiment illustrated in FIG. 3, the communication block 41 in the actuator 4 with the communication function has not only the modulation/demodulation block 411 and the communication logical block 412 but also an actuator operation detection circuit 413, and a retransmission operation of FIG. 3 differs from that of FIG. 1 in that the number of data to be retransmitted is restrained and the communication block 41 in the actuator 4 with the communication function has the actuator operation detection circuit 413.

Figure 4:
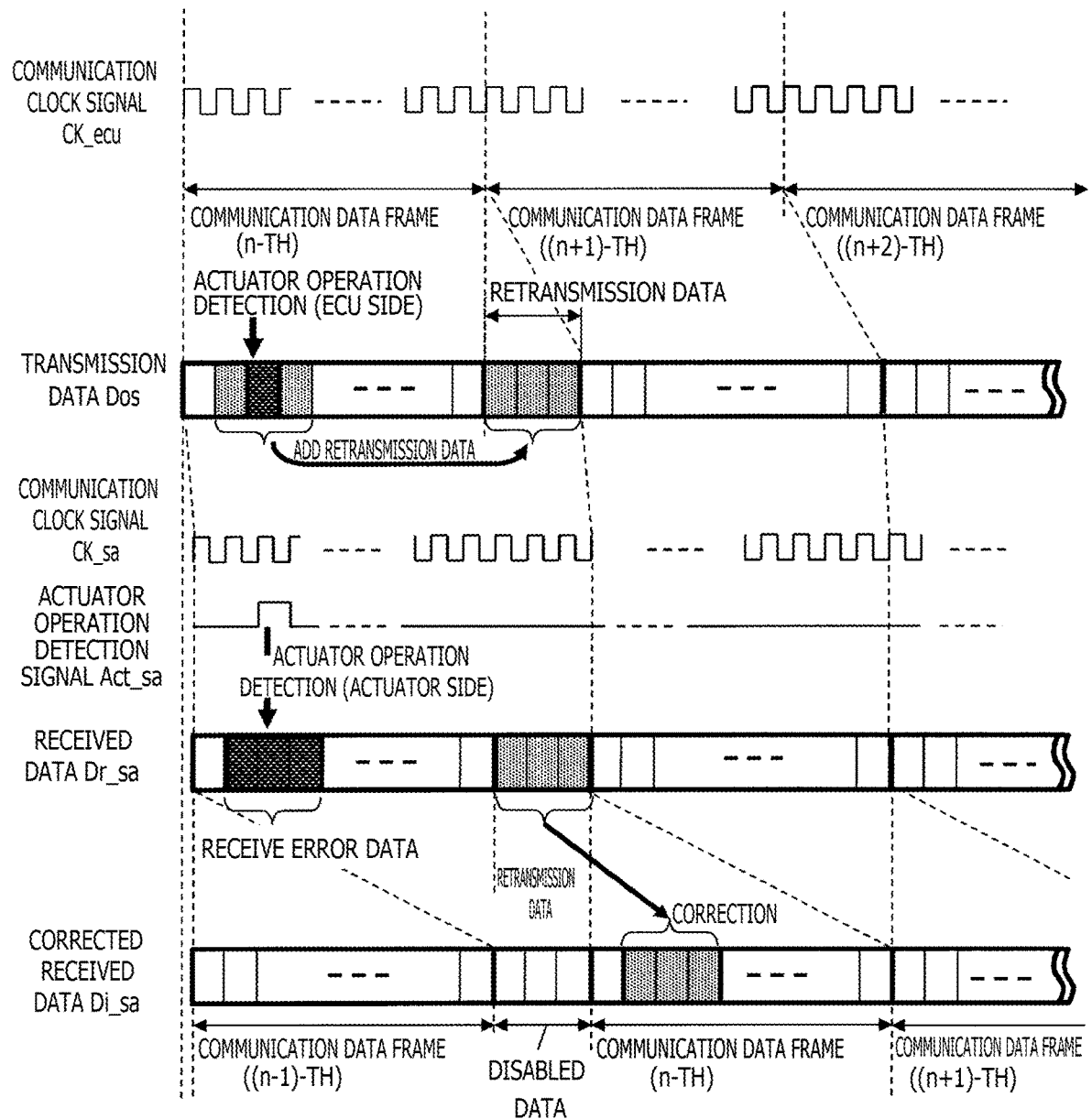
FIG. 4 illustrates a transmission/received flow representing a retransmission operation according to the second embodiment.

The retransmission operation when the actuator 43 operates and a communication error occurs in the present embodiment will next be described. FIG. 4 illustrates an example of a transmission/received data flow that represents a retransmission operation and an error correction operation performed by the communication block 41 in a transmission/reception operation from the ECU 1 to the actuator 4. With reference to FIG. 4, a retransmission operation performed by the communication control block 12 in the ECU 1 and the error correction operation performed by the communication logical block 412 in the actuator 4 will be described. FIG. 4 depicts operations in a case in which during consecutive transmission of the data Do_ecu from the ECU 1 to a plurality of actuators or sensors, one of the actuators 4 connected to the same power line operates in the n-th communication frame (in a state of transmitting the data Do_ecu to an n-th actuator or sensor) to change an actuator drive current Idrv (which is, in other words, defined as the "actuator operation"), the current and the voltage of the power line bus 3 vary, and a communication error occurs.

It is noted that data in one communication frame represents a data row transmitted to one actuator by one communication. When the one actuator 4 operates, the current of the power line bus 3 greatly changes, and a communication error occurs in the n-th communication frame, then the actuator operation detection circuit 122 in the control station communication block 12 detects this current change and outputs the detection signal Act_ecu indicating the detection to the communication logical block 121 synchronously with the ECU-side communication clock CK_ecu. Upon receiving this actuator operation detection signal Act_ecu, the communication logical block 121 adds data of a plurality of bits transmitted before and after time of this detection, for example, data of bits that including a transmission bit at the time of this detection and bits before and after the time of the detection to an end of the same n-th communication frame, re-outputs the data, and outputs data in a next (n+1)-th communication frame to the voltage modulation circuit 1231 as the signal Dos after this re-output. Upon receiving this signal Dos, the voltage modulation circuit 1231 sends the signal voltage to the power line bus 3. It is noted that it is necessary to delay the time of the detection by the actuator operation detection circuit 122 by as much as a time difference between output time of the communication logical block 121 and sending time of the voltage modulation circuit 1231 in the light of this time difference.

On the other hand, in the actuator 4 with the communication function, the voltage demodulation circuit 4112 converts a potential change of the power line bus 3 into the voltage signal Dr_sa, and outputs the voltage signal Dr_sa to the communication logical block 412. The actuator operation detection circuit 413 detects a voltage change due to the change in the actuator drive current Idrv during reception of the n-th communication frame, and outputs the voltage change, as an actuator operation detection signal Act_sa, to the communication logical block 412 synchronously with a communication clock CK_sa of the actuator 4 with the communication function. An interconnection length of an in-vehicle power line bus is equal to or smaller than approximately 20 m at most and a communication cycle is approximately several us. Time for which the current/voltage signal travels to an entire length of the power line bus due to the change in the actuator drive current is approximately 100 nm at most, and the time is shorter than communication cycle time by approximate one digit. Owing to this, the actuator operation detection signal Act_ecu detected by the actuator operation detection circuit 122 in the control station communication block 12 and the actuator operation detection signal Act_sa detected by the actuator operation detection circuit 413 in the actuator 4 with the communication function can be detected at the same time within the same communication cycle, that is, in terms of communication cycle units. Therefore, the actuator operation detection signal Act_sa of the actuator 4 with the communication function can detect time of occurrence of the communication error with the demodulated signal Dr_sa of the voltage demodulation circuit 4112. In the case of FIG. 4, the communication error occurs in a third bit in the n-th communication frame, and retransmission data of bits that are this third bit and bits before and after the third bit is added to a trail end of the communication frame. Therefore, as illustrated in FIG. 4, the communication logical block 412 extracts the retransmission data from the received data Dr_sa, corrects the communication error by replacing the bits including the bit to which the communication error occurs and the bits before and after the bit by the retransmission data, and outputs the resultant data, as the signal Di_sa, to the control/drive block 42.

Figure 5:
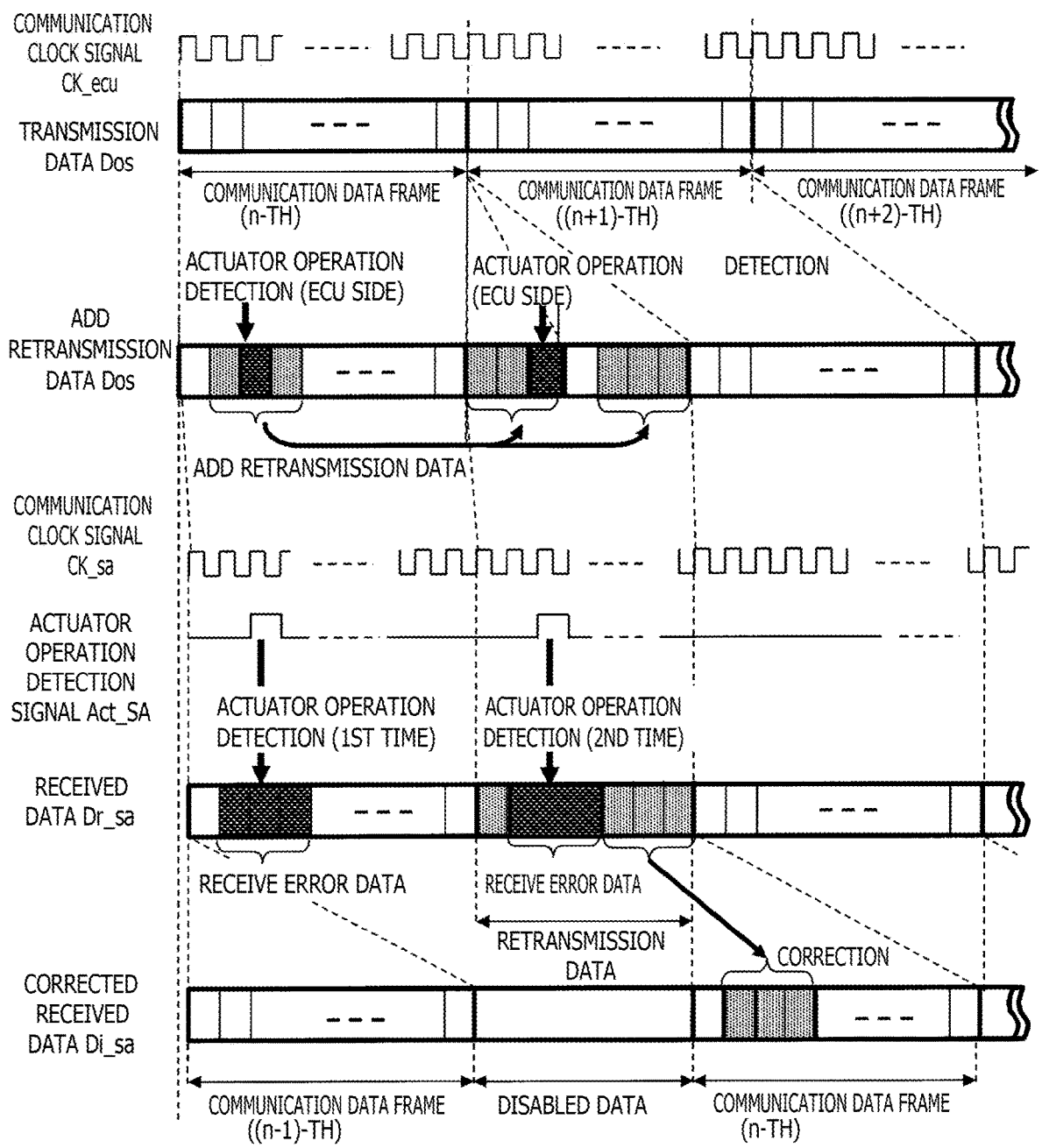
FIG. 5 illustrates a transmission/received flow representing a retransmission operation when an actuation operation occurs again during the retransmission operation according to the second embodiment.

FIG. 5 illustrates a communication operation in a case of occurrence of actuator operations in both the n-th communication frame and a retransmission data frame for correcting the communication error occurring in the n-th communication frame. In such a case, when one actuator operation is detected in the n-th communication frame, the communication logical block 121 in the control station communication block 12 adds the retransmission data of the bits including the bit at the time of the detection and the bits before and after the bit to the transmission data Dos output from the communication logical block 121 after the transmission data in the n-th communication frame, and outputs the resultant transmission data Dos to the voltage modulation circuit 1231. At this time, in a case of detecting an actuator operation again during transmission of this retransmission data, the communication logical block 121 re-outputs the retransmission data one communication cycle after the time of the detection of the actuator operation. On the other hand, when the actuator 4 with the communication function also detects the two actuator operations, and detects the second actuator operation at the time of adding the retransmission data as illustrated in FIG. 4, the actuator 4 with the communication function ignores the data before and after this time and corrects the received data using the retransmission data added again thereafter. As a result, even if a communication error occurs, the correct control data is always output to the actuator control/drive block 42.

According to the present embodiment, it is possible to realize a communication using the power line in circumstances of continuing the power feeding from the direct-current power supply to the power line. Specifically, even if the communication error occurs due to the change in the drive current driving the actuator 43, the control station communication block 12 can detect the change and identify the communication error location; thus, it is possible to retransmit the data before and after the time of the error. As a result, the communication error can be corrected using this retransmission data and no communication error occurs in the communication between the actuator 4 with the communication function and the control station communication block 12 in the power line communication device. Furthermore, adding a control signal of the bits that include the transmission bit at the time of detecting the actuator operation and a few bits before and after the transmission bit and transmitting the transmission data can reduce an amount of the retransmission data, compared with retransmission of the signal in one frame as in the first embodiment.

Third Embodiment

Figure 6:
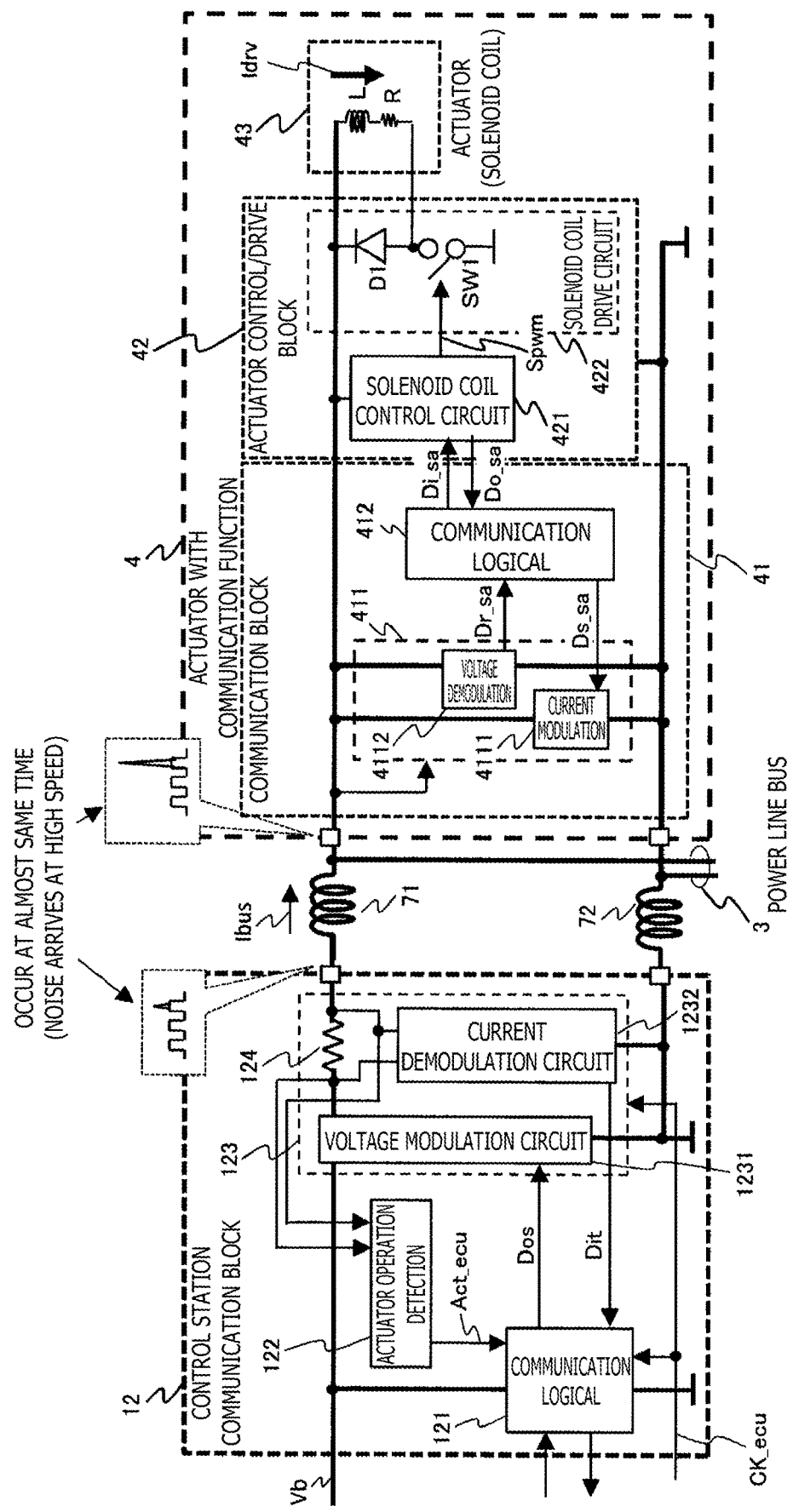
FIG. 6 illustrates an electronic control system with a power line communication function intended for a solenoid coil according to a third embodiment of the present invention.

FIG. 6 illustrates an example of a configuration of an electronic control system with a power line communication device according to a third embodiment. It is noted, however, that FIG. 6 does not depict the power supply 2 and a control block 11 in the ECU 1. The electronic control system according to the present embodiment is the electronic control system in which a solenoid coil is applied to the actuator 43 of the first embodiment. The actuator control/drive block 42 has a solenoid coil control circuit 421, and a solenoid coil drive circuit 422 that has a switch SW1 and a diode D1. A mean current of the drive current Idrv running through the solenoid coil 43 is controlled by a time width, by which the switch SW1 is turned on, that is, a pulse width of a control signal Spwm, relative to an on/off cycle of the SW1. In other words, the drive current Idrv is PWM (pulse width modulation) controlled by the control signal Spwm. It is noted that a frequency of the control pulse Spwm is several 100 Hz (on/off switching frequency of the switch SW1). As a current Ibus of the power line bus 3, the solenoid coil drive current Idrv runs therethrough when the switch SW1 is turned on, and does not run when the switch SW1 is turned off. Owing to this, a large voltage/current change, that is, a voltage/current noise is generated in the power line bus 3 at time of switchover of the solenoid coil drive current (time of turning on or off the switch SW1). As described in the first embodiment, this voltage current noise travels to the control station communication block 12 and to the actuator 4 with the communication function almost at the same time in communication cycle units. As a result, this voltage/current noise generates a distortion of the signal voltage, resulting in the occurrence of a communication error.

Figure 7:
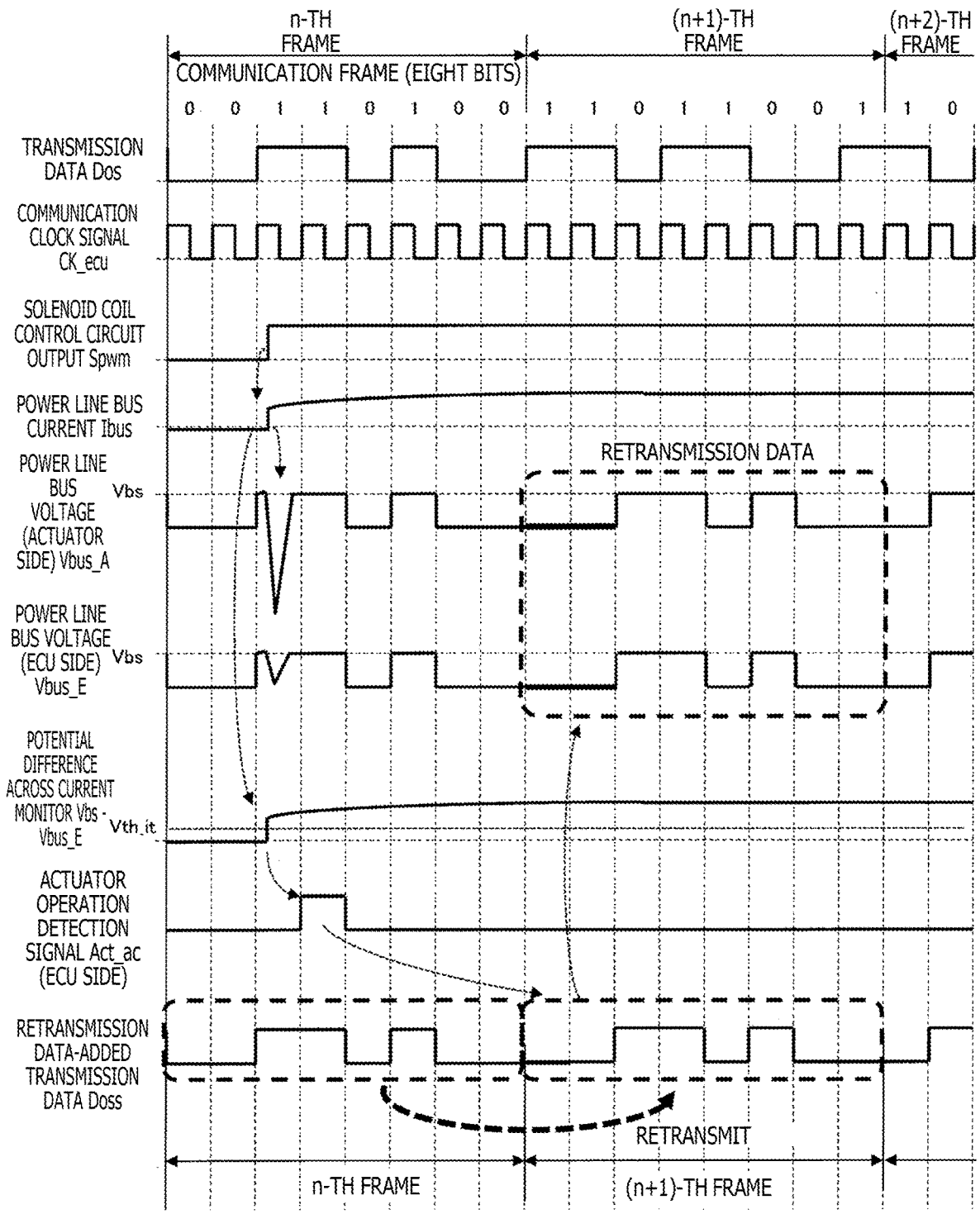
FIG. 7 is an example of a timing chart representing an actuator operation detection operation and a data retransmission operation intended for the solenoid coil according to the third embodiment.

FIG. 7 illustrates a timing chart representing a transmission operation performed by the control station communication block 12 when the drive current driving the solenoid coil 43 changes during the communication of the ECU 1 with the actuator 4 with the communication function. The transmission operation according to the present embodiment will be described with reference to FIG. 7. For the sake of description, it is assumed in FIG. 7 that a communication frame length is eight bits and that the solenoid coil drive current changes in the n-th communication frame. When the solenoid coil drive current has no change, a power line bus voltage Vbus_E on the ECU 1 side and a power line bus voltage Vbus_A on the actuator 4 with the communication function side have a voltage waveform such that both of the voltages Vbus_E and Vbus_A are subjected to voltage modulation with the transmission data Dos from the communication logical block 121 in the control station communication block 12, and superimposed on a power supply voltage fibs of the power supply 2. However, as described above, when the solenoid coil control signal Spwm transitions to a high level, then the switch SW is turned on and the drive current Idrv runs from the power line bus 3 through the solenoid coil 43. At this moment, the current running through the power line bus 3 greatly changes, so that a large voltage noise is generated in the power line bus voltage Vbus_A on the actuator 4 with the communication function side by a parasitic inductance 71 of the power line bus 3. At this time, the power line bus current Ibus runs through the power line current monitor resistor 124 in the control station communication block 12; thus, a potential difference Vbus–Vbus_E proportional to the power line bus current Ibus is produced across the power line current monitor resistor 124. When this potential difference Vbus–Vbus_E exceeds a threshold voltage Vth_it, the actuator operation detection circuit 122 in the control station communication block 12 outputs the signal Act_ecu synchronous with the communication clock CK_ecu to the communication logical block 121. Upon receiving this actuator operation detection signal Act_ecu, the communication logical block 121 re-outputs the same data as that in the n-th communication frame to the modulation/demodulation block 123 as that in the next (n+1)-th communication frame. This data is modulated into the voltage signal by the voltage modulation circuit 1231 and the voltage signal is sent to the power line bus 3.

Figure 8:
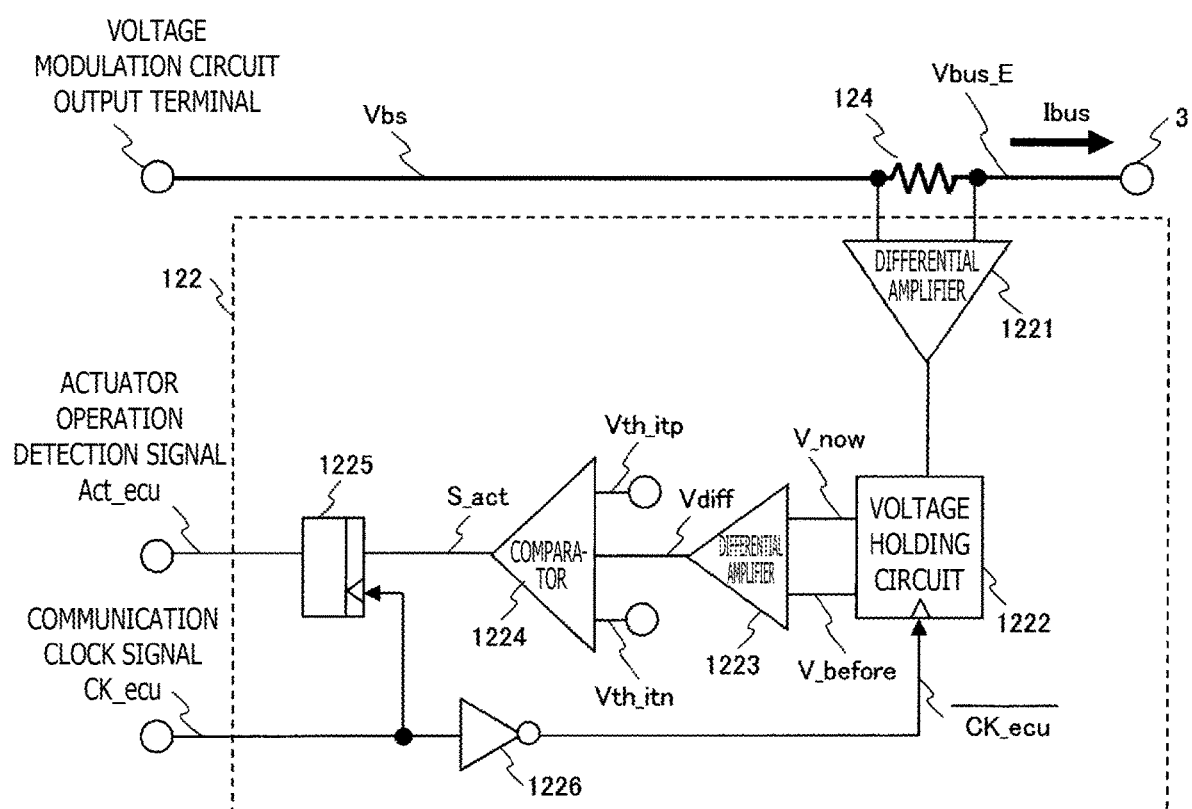
FIG. 8 illustrates an example of a configuration of an actuator operation detection circuit in an ECU.

FIG. 8 is an example of a configuration of the actuator operation detection circuit 122 in the control station communication block 12. The actuator operation detection circuit 122 has a differential amplifier 1221 that converts the power line bus current Ibus into a voltage, a voltage holding circuit 1222 that holds an output voltage from the differential amplifier 1221 by the communication clock signal CK_ecu, a differential amplifier 1223 that detects the actuator operation from this held output voltage, a comparator 1224, a flip-flop 1225, and an inverter 1226 that outputs a communication clock obtained by inverting a polarity of the communication clock CK_ecu.

Figure 9:
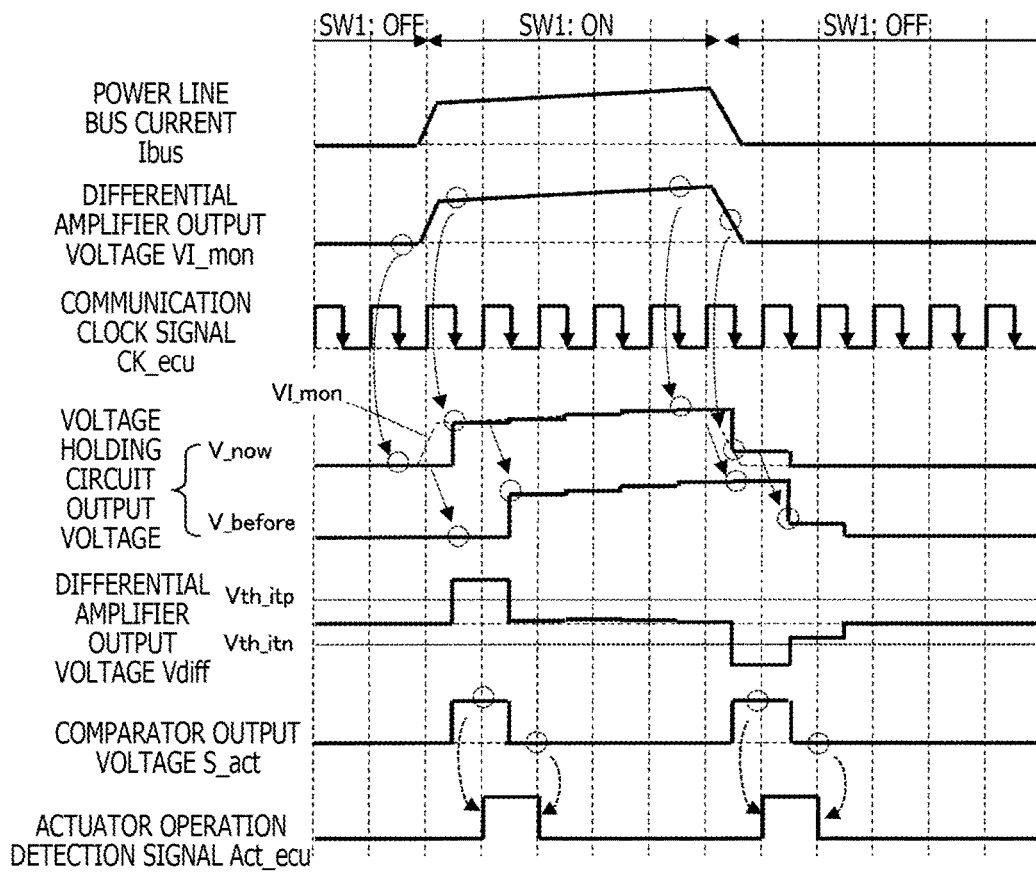
FIG. 9 is an example of a timing chart representing an operation performed by the actuator operation detection circuit of FIG. 8.

FIG. 9 is a timing chart representing an actuator operation detection operation performed by this actuator operation detection circuit 122. The actuator operation detection operation, that is, an operation for detecting the change in the power line bus current Ibus, performed by the actuator operation detection circuit 122 will be described with reference to FIG. 9. The solenoid coil drive current Idrv runs through the power line bus 3 when the switch SW1 is turned on by the solenoid coil control signal Spwm, and the power line bus current does not run when the switch SW1 is turned off. Owing to this, the current Ibus running through the power line bus 3 has a large current change during transition of the switch SW1 from an ON-state to an OFF-state and vice versa. This actuator operation detection circuit 122 detects this current change by the potential difference across the power line current monitor resistor 124. Specifically, running of the power line bus current Ibus through the power line current monitor resistor 124 generates the potential difference proportional to the power line bus current Ibus across this resistor 124. Amplifying this potential difference by the differential amplifier 1221 causes conversion of the power line bus current Ibus into a voltage signal VI_mon. Furthermore, the voltage holding circuit 1222 holds potentials V_now and V_before in two consecutive cycles of this voltage signal VI_mon at timing of a falling edge of the communication clock CK_ecu. The differential amplifier 1223 outputs a difference between the two potentials V_now and V_before. When this difference is large, the power line bus current Ibus largely changes and the solenoid coil drive current largely changes for time between the two cycles described above. The comparator 1224 detects the actuator operation by this difference voltage. Specifically, the comparator 1224 outputs a high level if this difference is higher than a threshold voltage Vth_itp and lower than a threshold voltage Vth_itn, and outputs a low level if the difference is between the threshold voltages Vth_itp and Vth_itn. The flip-flop 1225 holds an output signal S act from the comparator 1224 at timing of a rising edge of the communication clock CK_ecu and outputs the output signal as the actuator operation detection signal Act_ecu. This actuator operation detection circuit 122 detects the change and outputs the actuator operation detection signal Act_ecu both in a case in which the switch SW1 is turned on and the power line bus current Ibus increases and in a case in which the switch SW1 is turned off and the power line bus current Ibus decreases.

Fourth Embodiment

Figure 10:
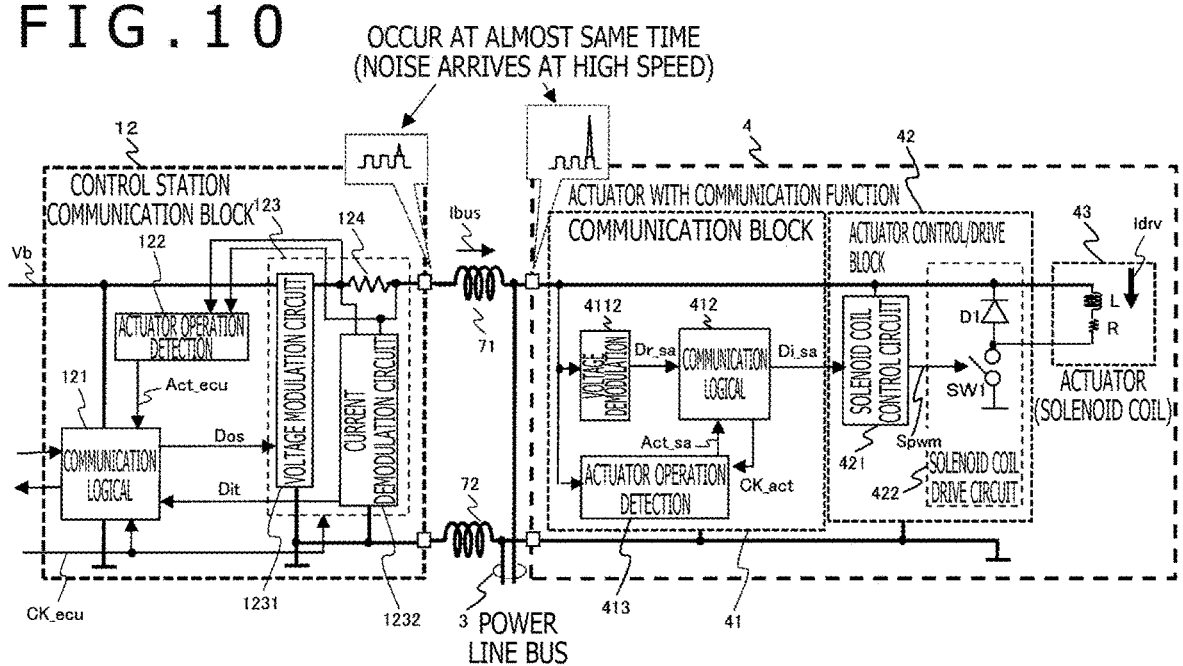
FIG. 10 illustrates an electronic control system with a power line communication function intended for a solenoid coil according to a fourth embodiment of the present invention.

FIG. 10 illustrates an example of a configuration of an electronic control system, in which a solenoid coil is applied to the actuator 43 of the second embodiment, according to a fourth embodiment. It is noted that FIG. 10 does not depict the power supply 2 and the control block 11 in the ECU 1. The actuator control/drive block 42 has the solenoid coil control circuit 421, and the solenoid coil drive circuit 422 that has the switch SW1 and the diode D1. A mean current of the drive current Idrv running through the solenoid coil 43 is controlled by a time width, for which the switch SW1 is turned on, that is, a pulse width of a control signal Spwm, relative to an on/off cycle of the SW1. In other words, the drive current Idrv is PWM (pulse width modulation) controlled by the control signal Spwm. It is noted that a frequency of the control pulse Spwm is several 100 Hz (an on/off switching frequency of the switch SW1). As the current Ibus of the power line bus 3, the solenoid coil drive current Idrv runs through the power line bus 3 when the switch SW1 is turned on, and does not run therethrough when the switch SW1 is turned off. Owing to this, a large voltage/current change, that is, a voltage/current noise is generated at time of switchover of the solenoid coil drive current (time of turning on or off the switch SW1). As described in the first embodiment, this voltage/current noise travels to the control station communication block 12 and to the actuator 4 with the communication function almost at the same time in terms of communication cycle units. As a result, this voltage/current noise generates a distortion of the signal voltage, resulting in the occurrence of a communication error.

Figure 11:
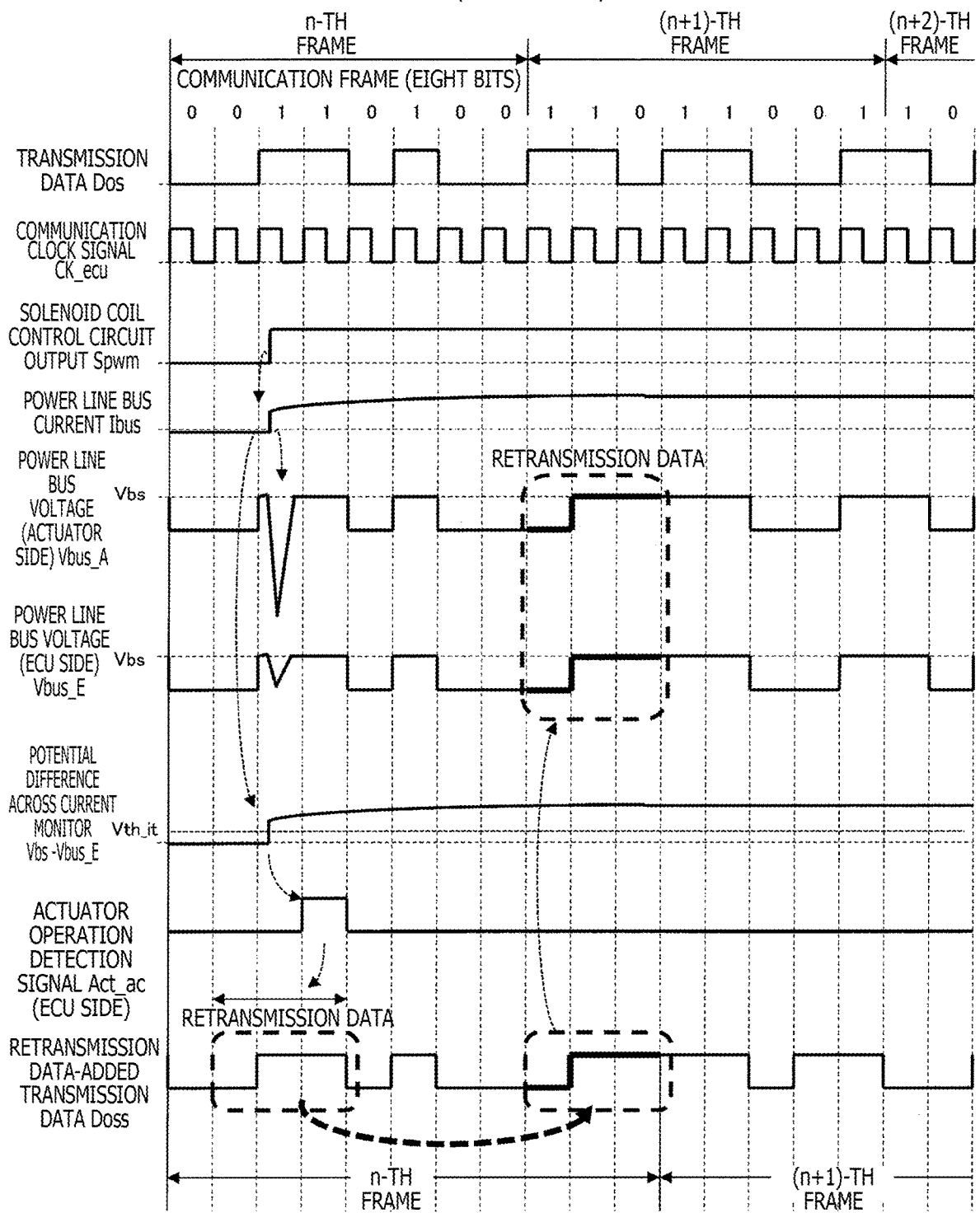
FIG. 11 is an example of a timing chart representing an actuator operation detection operation and a data retransmission operation intended for a solenoid coil according to the fourth embodiment.

FIG. 11 illustrates a timing chart representing a transmission operation performed by the control station communication block 12 when the drive current driving the solenoid coil 43 changes during the communication of the ECU 1 with the actuator 4 with the communication function. The transmission operation according to the present embodiment will be described with reference to FIG. 11. For the sake of description, it is assumed in FIG. 11 that the communication frame length is eight bits and that the solenoid coil drive current changes in the n-th communication frame. When the solenoid coil drive current has no change, the power line bus voltage Vbus_E on the ECU 1 side and the power line bus voltage Vbus_A on the actuator 4 with the communication function side have the voltage waveform such that both of the voltages Vbus_E and Vbus_A are subjected to voltage modulation with the transmission data Dos from the communication logical block 121 in the control station communication block 12, and superimposed on the power supply voltage Vbs of the power supply 2. However, as described above, when the solenoid coil control signal Spwm transitions to a high level, then the switch SW is turned on and the drive current Idrv runs from the power line bus 3 through the solenoid coil 43. At this moment, the current running through the power line bus 3 greatly changes, so that a large voltage noise is generated in the power line bus voltage Vbus_A on the actuator 4 with the communication function side by a parasitic inductance 71 of the power line bus 3. At this time, the power line bus current Ibus runs through the power line current monitor resistor 124 in the control station communication block 12; thus, a potential difference Vbus–Vbus_E proportional to the power line bus current Ibus is produced across the power line current monitor resistor 124. When this potential difference Vbus–Vbus_E exceeds a threshold voltage Vth_it, the actuator operation detection circuit 122 in the control station communication block 12 outputs the signal Act_ecu synchronous with the communication clock CK_ecu to the communication logical block 121. Upon receiving this actuator operation detection signal Act_ecu, the communication logical block 121 adds the data in three cycles including time of receiving the actuator operation detection signal Act_ecu, to the end of the n-th communication frame, and re-outputs the data as the signal Dos. While the data in the three cycles prior to the time of output of the actuator operation detection signal Act_ecu is set as the retransmission data in this example, data in three or more cycles before and after the time of output of the actuator operation detection signal Act_ecu may be set as the retransmission data.

Figure 12:
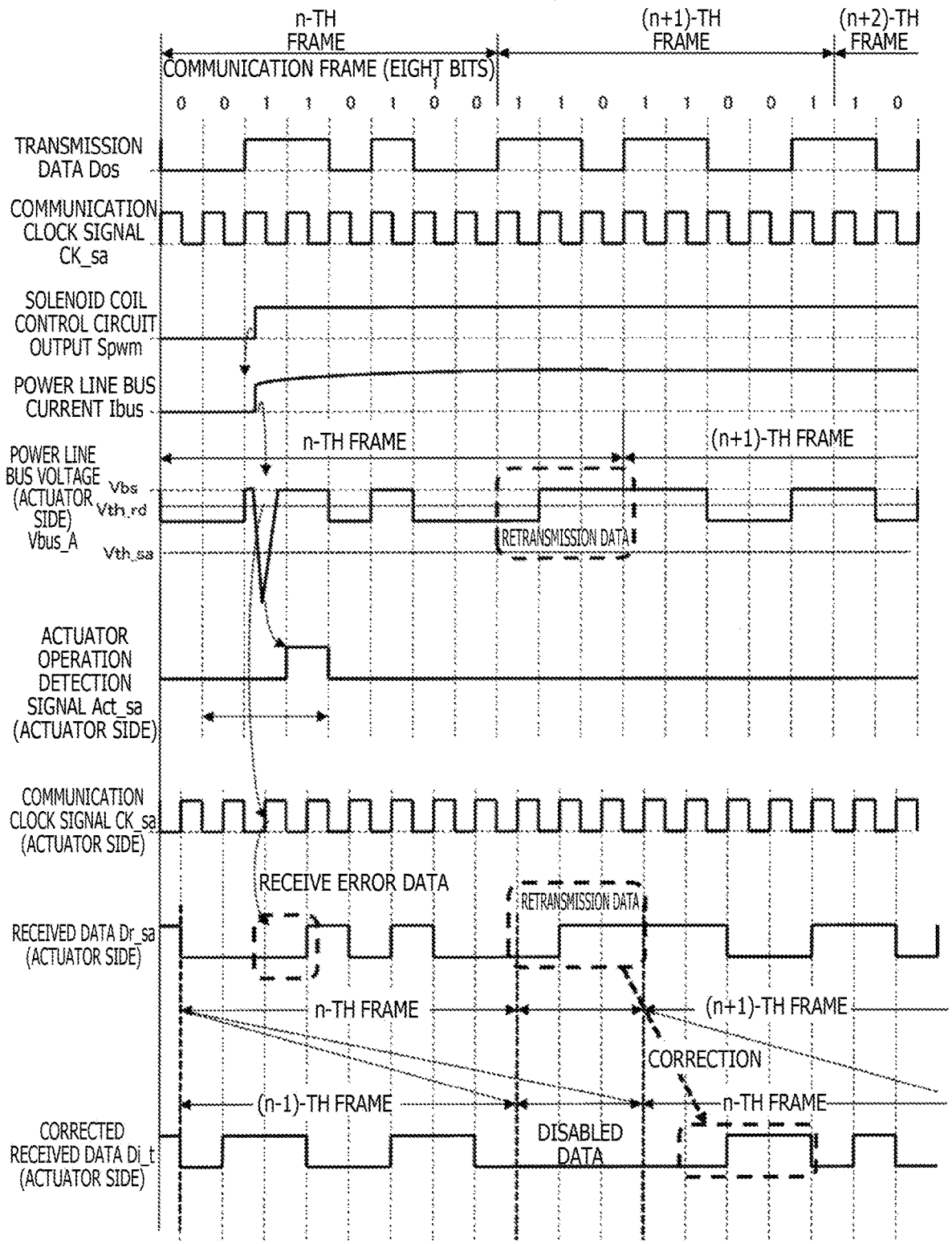
FIG. 12 is an example of a timing chart representing a reception operation during the actuator operation intended for the solenoid coil according to the fourth embodiment.

FIG. 12 illustrates a timing chart representing a reception operation by the actuator 4 with the communication function during the communication of the ECU 1 with the actuator 4 with the communication function. In the actuator 4 with the communication function, the voltage demodulation circuit 4112 converts the potential change of the power line bus 3 into the voltage signal Dr_sa and outputs the voltage signal Dr_sa to the communication logical block 412. The actuator operation detection circuit 413 detects the voltage change due to the change in the actuator drive current Idrv during reception of the n-th communication frame, and outputs the voltage change, as the actuator operation detection signal Act_sa, to the communication logical block 412 synchronously with the actuator communication clock CK_sa of the actuator 4 with the communication function. As described in the first embodiment, the actuator operation detection signal Act_ecu detected by the actuator operation detection circuit 122 in the control station communication block 12 and the actuator operation detection signal Act_sa detected by the actuator operation detection circuit 413 in the actuator 4 with the communication function can be detected at the same time within the same communication cycle, that is, in terms of communication cycle units. Therefore, the actuator operation detection signal Act_sa of the actuator 4 with the communication function can detect the time of occurrence of the communication error with the demodulated signal Dr_sa of the voltage demodulation circuit 4112 in the actuator 4 with the communication function. In the case of FIG. 12, the communication error occurs in the third bit in the n-th communication frame, and the retransmission data of bits that are this third bit and bits before and after the third bit is added to the trail end of the communication frame. Therefore, as illustrated in FIG. 12, the communication logical block 412 extracts the retransmission data from the received data Dr_sa, corrects the communication error by replacing the bits including the bit to which the communication error occurs and the bits before and after the bit by the retransmission data, and outputs the resultant data, as the signal Di_sa, to the control/drive block 42. As a result, even if a communication error occurs, the correct control data is always output to the actuator control/drive block 413.

Figure 13:
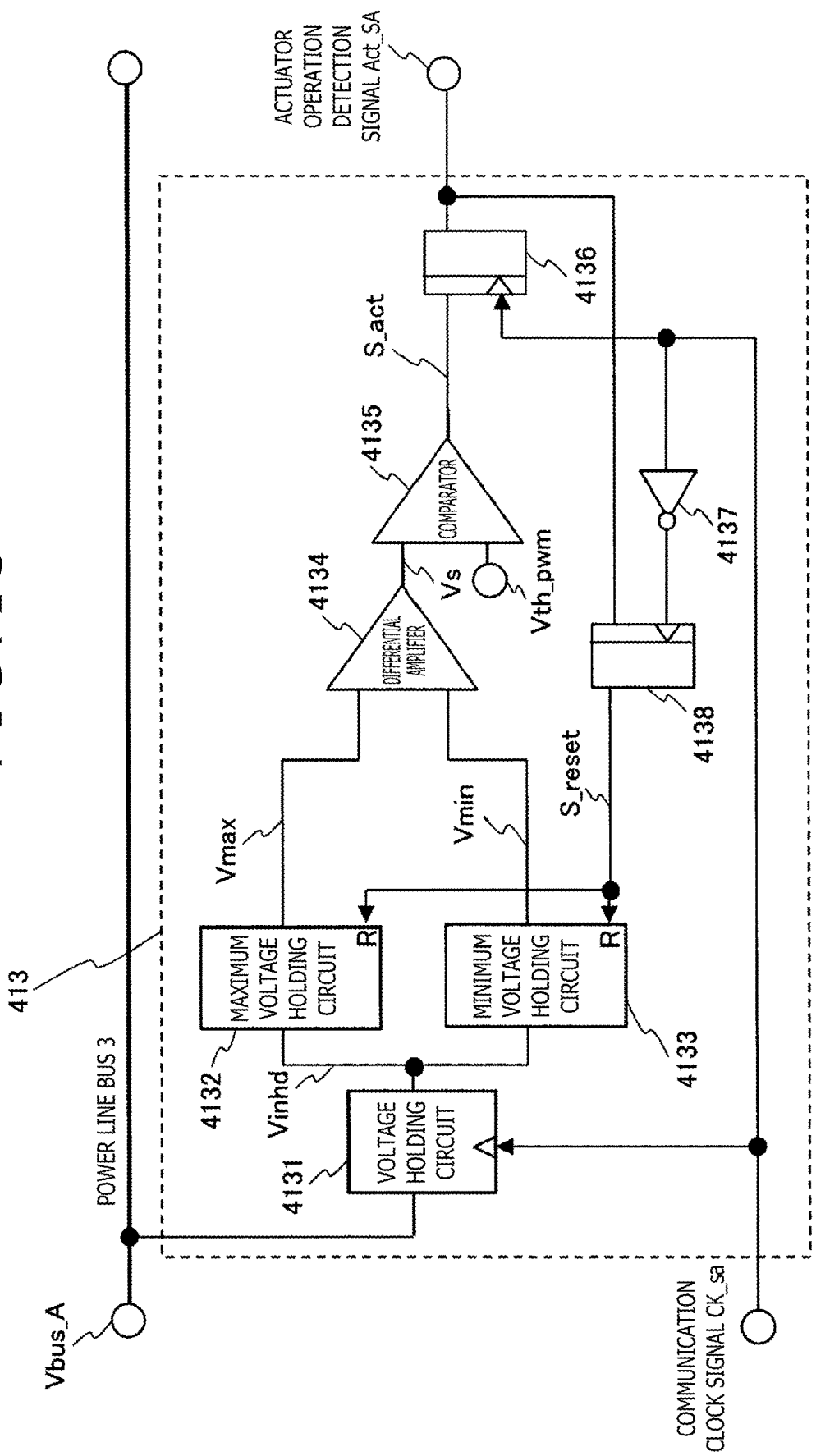
FIG. 13 is an example of a configuration of an actuator operation detection circuit in a sensor or an actuator with a communication function.

FIG. 13 is an example of a configuration of the actuator operation detection circuit 413 in the actuator 4 with the communication function. The actuator operation detection circuit 413 has a voltage holding circuit 4131 that holds the potential of the power line bus potential Vbus_A, a maximum voltage holding circuit 4132 that holds a maximum value of an output voltage from the voltage holding circuit 4131, a minimum voltage holding circuit 4133 that holds a minimum value of the output voltage from the voltage holding circuit 4131, a differential amplifier 4134 that obtains a difference between an output voltage from the maximum voltage holding circuit 4132 and that from the minimum voltage holding circuit 4133, a comparator 4135 that compares a threshold voltage Vth_pwm with an output voltage from the differential amplifier 4134, two flip-flops 4136 and 4138, and an inverter 4137 that outputs a communication clock signal obtained by inverting a polarity of the communication clock signal CK_sa.

Figure 14:
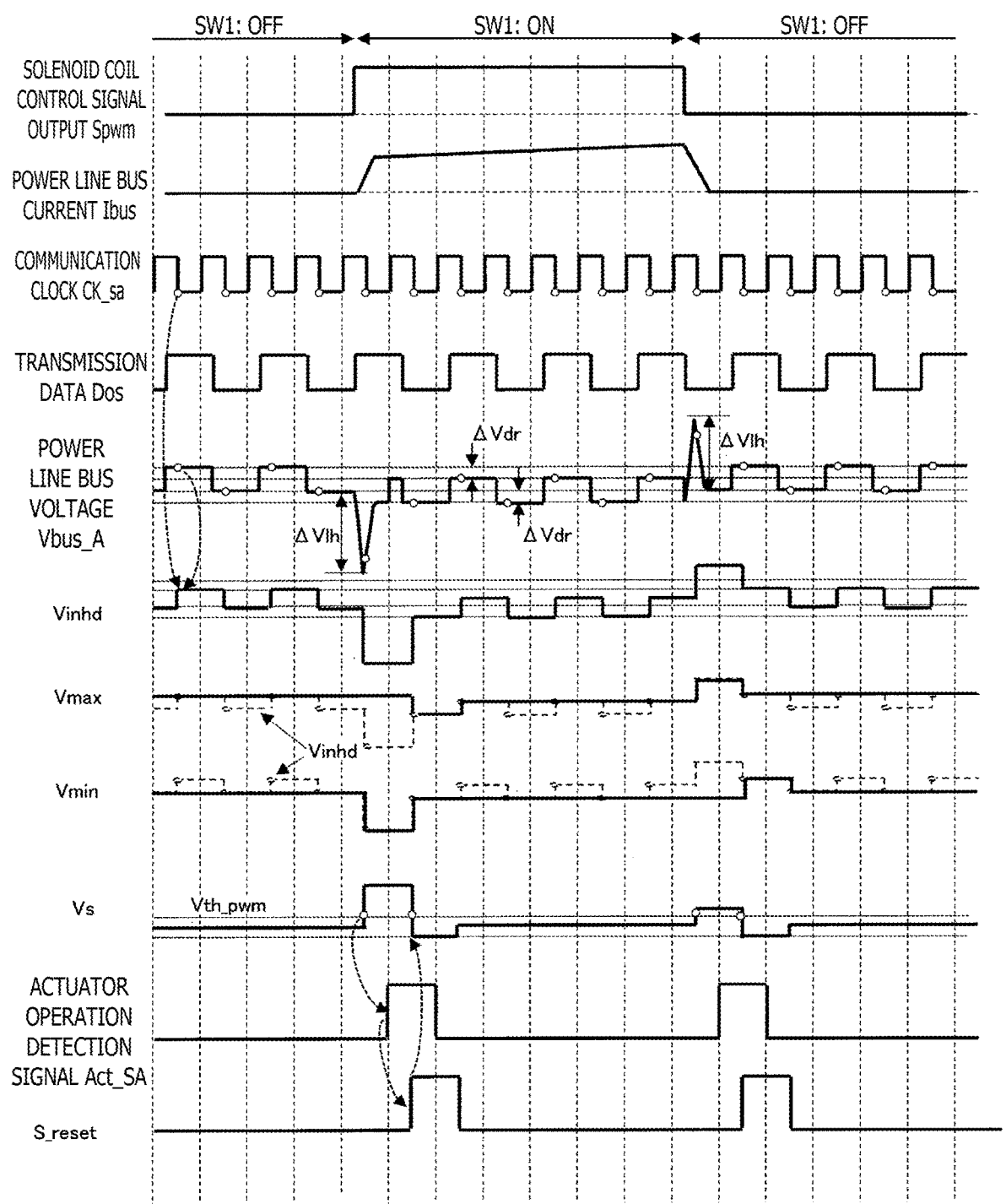
FIG. 14 is an example of a timing chart representing an operation performed by an actuator operation detection circuit in the sensor or the actuator with the communication function.

FIG. 14 illustrates a timing chart representing an actuator operation detection operation performed by this actuator operation detection circuit 413. The operation for detecting the change in the solenoid coil drive current from a change in the power line bus potential Vbus_A will be described with reference to FIG. 14. When the solenoid coil control signal Spwm becomes a high level, then the switch SW1 is turned on, the solenoid coil drive current runs through the power line current monitor resistor 124 in the control station communication block 12 via the power line bus 3 to cause a voltage drop, and the power line bus voltage falls by ΔVdr. When the solenoid coil control signal Spwm becomes a low level, no current runs through the power line bus 3 and the voltage drop does not, therefore, occur in the power line bus voltage Vbus_A. Accordingly, a voltage fluctuation ΔVdr caused by the solenoid coil drive current occurs to the power line bus 3. In addition, a current change of the power line bus current Ibus at a time of a rising transition and a falling transition of the solenoid coil control signal Spwm and the parasitic inductance 71 of the power line bus 3 cause a large voltage fluctuation ΔVln in the power line bus 3. On the other hand, the voltage signal from the control station communication block 12 is superimposed on the voltage of the power line bus 3, and a voltage fluctuation caused by this voltage signal and a voltage fluctuation caused by the change in the solenoid coil drive current occur to the voltage of the power line bus 3 in a mixed fashion. Owing to this, this actuator operation detection block 413 needs to discriminate the voltage fluctuation caused by the change in the solenoid coil drive current from the three voltage fluctuations, and to detect only the change in the solenoid coil drive current. A specific operation for the detection will be described with reference to FIG. 14. FIG. 14 is the timing chart representing the operation in a case of the change in the solenoid coil drive current Idrv when "1" and "0" are alternately and continuously transmitted as the transmission data Dos. The power line bus voltage Vbus_A has a waveform such that the signal voltage from the control station communication block 12 is superimposed on a voltage noise due to the change in the solenoid coil drive current. The voltage holding circuit 4131 holds this power line bus voltage Vbus_A at timing of the falling edge of the communication clock signal CK_sa and outputs the held power line bus voltage as a voltage signal Vinhd. This voltage signal Vinhd is input to the maximum voltage holding circuit 4132, the maximum voltage holding circuit 4132 holds a maximum voltage of this voltage signal Vinhd and outputs the held maximum voltage as a voltage signal Vmax, and the minimum voltage holding circuit 4133 holds a minimum voltage of this voltage signal Vinhd and outputs the held minimum voltage as a voltage signal Vmin. The differential amplifier 4134 obtains the difference between the output voltages from these two circuits 4132 and 4133 and outputs the difference as a voltage signal Vs. The time at which this voltage signal Vs is equal to or higher than the threshold voltage Vth_pwm is the time at which the solenoid coil drive current greatly changed. Owing to this, the comparator 4135 outputs, as a voltage signal S act, a high level when the voltage of this voltage signal Vs is higher than the threshold voltage Vth_pwm and a low level when the voltage of this voltage signal Vs is lower than the threshold voltage Vth_pwm, and detects the time at which the solenoid coil drive current greatly changed. The flip-flop 4136 outputs, as the actuator operation detection signal Act_sa, this signal S act to the communication logical block 412 synchronously with the communication clock signal CK_sa. It is noted that when this signal Act_sa becomes a high level, then a reset signal S_reset becomes a high level, the output voltage from the maximum voltage holding circuit 4132 becomes equal to that from the minimum voltage holding circuit 4133, and both of the circuits 4132 and 4133 are reset.

Figure 15:
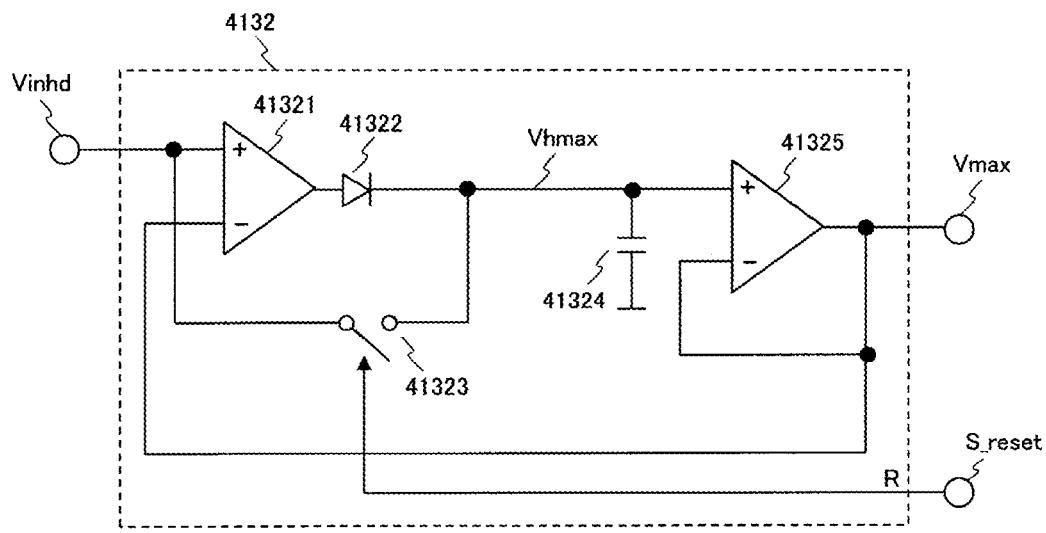
FIG. 15 illustrates an example of a configuration of a maximum voltage holding circuit.

FIG. 15 illustrates a specific example of a configuration of the maximum voltage holding circuit 4132. The maximum voltage holding circuit 4132 has an operational amplifier 41321, a diode 41322, a switch 41323, a capacitive element 41324, and an operational amplifier 41325. First, when the reset signal S_reset becomes a high level, then the switch 41323 is turned on, and an internal node voltage Vhmax becomes equal to the input signal Vinhd. The output voltage Vmax is always kept equal to the internal node voltage Vhmax by the operational amplifier 41325. When the reset signal S_reset becomes a low level, the switch 41323 is turned off. The operational amplifier 41321 always compares the input voltage Vinhd with the internal node voltage Vhmax, and the capacitive element 41324 is charged so that the internal node voltage Vhmax is equal to the input voltage Vinhd when the input voltage Vinhd is higher than the internal node voltage Vhmax. On the other hand, when the input voltage Vinhd is lower than the internal node voltage Vhmax, the internal node voltage Vhmax is always kept at the maximum voltage of the input voltage Vinhd to inhibit discharge of the diode 41222.

Figure 16:
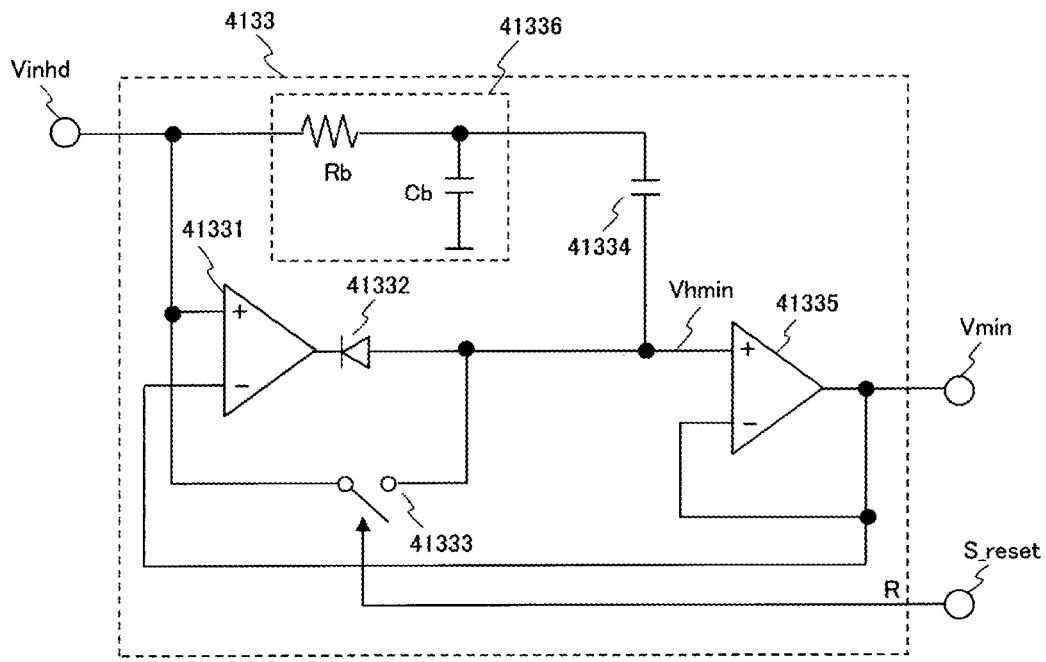
FIG. 16 illustrates an example of a configuration of a minimum voltage holding circuit.

FIG. 16 illustrates a specific example of a configuration of the minimum voltage holding circuit 4133. The minimum voltage holding circuit 4133 has an operational amplifier 41331, a diode 41332, a switch 41333, a capacitive element 41334, an operational amplifier 41335, and a power supply circuit 41336. In the minimum voltage holding circuit 4133, the power supply circuit 41336 is always set at a higher voltage than a minimum value of the input voltage Vinhd. As an output in this configuration example, a mean voltage of the input voltage Vinhd is output to the power supply circuit 41336 in an example of configuring the power supply circuit 41336 with a low-pass filter. When the reset signal S_reset become a high level, then the switch 41333 is turned on, and an internal node voltage Vhmin becomes equal to the input voltage Vinhd. The output voltage Vmax is always set equal to the internal node voltage Vhmax by the operational amplifier 41325. When the reset signal S_reset become a low level, the switch 41333 is turned off. The operational amplifier 41331 always compares the input voltage Vinhd with the internal node voltage Vhmin, and the capacitive element 41334 is charged so that the internal node voltage Vhmin is equal to the input voltage Vinhd when the input voltage Vinhd is lower than the internal node voltage Vhmin. On the other hand, when the input voltage Vinhd is higher than the internal node voltage Vhmin, the internal node voltage Vhmin is always kept at the minimum voltage of the input voltage Vinhd to inhibit discharge of the diode 41332.

According to the present embodiment, it is possible to realize a communication using the power line in circumstances of continuing the power feeding from the direct-current power supply to the power line. Specifically, even if the communication error occurs due to the change in the drive current driving the actuator 43, the control station communication block 12 can detect the change and identify the communication error location; thus, it is possible to retransmit the data before and after the time of the error. As a result, the communication error can be corrected using this retransmission data and no communication error occurs in the communication between the actuator 4 with the communication function and the control station communication block 12 in the power line communication device.

Fifth Embodiment

Figure 17:
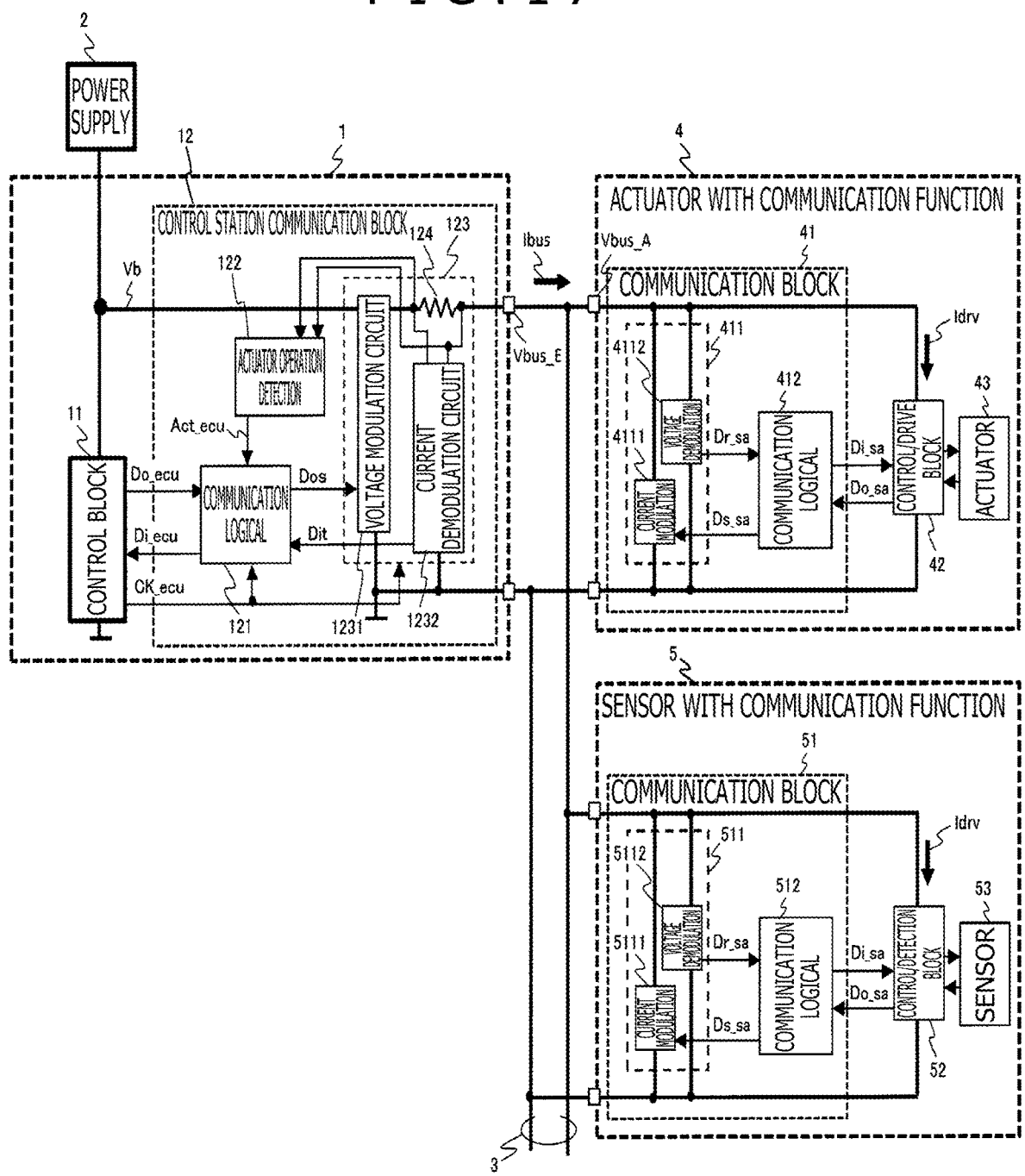
FIG. 17 illustrates an electronic control system in which a plurality of actuators and sensors each with a communication function are connected to the same power line according to a fifth embodiment of the present invention.

FIG. 17 illustrates an example of a configuration of an electronic control system with a power line communication device according to a fifth embodiment, and illustrates an example of the configuration such that a sensor 5 with a communication function is connected to the same power line bus 3 as the power line bus 3 to which the actuator 4 with the communication function and the control station communication block 12 of the first embodiment are connected. The control station communication block 12 has the communication logical block 121 that interfaces with the ECU 1, that performs coding/decoding of transmission/data by communication with the actuator 4 with the communication function and the sensor 5 with the communication function, and that performs data retransmission/error correction, and the modulation/demodulation block 123 that modulates the transmission/received data into a current/voltage signal and that transmits/receives the current/voltage signal via the power line bus 3. The actuator 4 with the communication function has the communication block 41 that performs coding/decoding of transmission/received data by communication with the control station communication block 12 and that performs data retransmission/error correction, the actuator control/drive block 42 that drives the actuator with actuator control data and that generates operation state information about the actuator, and the actuator 43. The sensor 5 with the communication function has a communication block 51 that performs coding/decoding of transmission/received data by communication with the control station communication block 12 and that performs data retransmission/error correction, a control/detection block 52 that exercises sensor state control and that converts an analog signal detected by a sensor into a digital signal, and the sensor 53. The communication block 51 that configures the sensor 5 with the communication function is identical in configuration to the communication block 41 of the actuator 4 with the communication function of the first embodiment. The constituent elements other than the sensor 5 with the communication function are identical in configuration to those of the first embodiment.

Therefore, all the blocks that hold communication in the control station communication block 12 and the sensor 5 with the communication function are identical in configuration to those of the first embodiment; thus, according to the present embodiment, similarly to the first embodiment, it is possible to realize a communication using the power line in circumstances of continuing the power feeding from the direct-current power supply to the power line. Specifically, even if the communication error occurs due to the chance in the drive current driving the actuator 43 in the communication between the control station communication block 12 and the communication block 51 in the sensor 5 with the communication function, the control station communication block 12 can detect the change and identify the communication error location; thus, it is possible to retransmit the data before and after the time of the error. As a result, the communication error can be corrected using this retransmission data and no communication error occurs in the communication between the sensor 5 with the communication function and the control station communication block 12 in the power line communication device.

INDUSTRIAL APPLICABILITY

The electronic control system equipped with the power line communication function according to the present invention is applicable to the communication with the sensor and/or the actuator for the acquisition of various vehicle information and control over the sections of the vehicle in the automobile. Furthermore, the electronic control system equipped with the power line communication function according to the present invention is not limited to the in-vehicle electronic control system but is widely applicable to a sensor system and the like other than the in-vehicle electronic control system.

DESCRIPTION OF REFERENCE CHARACTERS

1: Electronic control unit ECU
2: Power supply
3: Power line bus
4: Actuator with communication function
5: Sensor with communication function
11: Control block
12: Control station communication block
121: Communication logical block
122: Actuator operation detection circuit
123: Modulation/demodulation block
1231: Voltage modulation circuit
1232: Current demodulation circuit
124: Power line current monitor resistor
41, 51: Communication block
42: Actuator control/drive block
43: Actuator
52: Sensor control/detection block
53: Sensor
411, 511: Modulation/demodulation block 412, 512: Communication logical block
413, 513: Actuator operation detection circuit
4111, 5111: Current modulation circuit
4112, 5112: Voltage demodulation circuit

The invention claimed is:

1. An electronic control unit that includes a communication section outputting a control signal and that can transmit the control signal to an actuator connected to the electronic control unit via a power line, the electronic control unit comprising an actuator operation detection section, wherein when the actuator operation detection section detects an actuator operation, the communication section retransmits the control signal at timing of detecting the actuator operation, wherein the communication section adds a control signal of bits that include a transmission bit at the timing of detecting the actuator operation and either one or a plurality of bits before and after the transmission bit to an end of a same communication frame, and transmits the control signal, and in a case of detecting an actuator operation again while adding the control signal to the end of the same frame and transmitting the control signal, the communication section transmits again retransmission data one communication cycle after the timing of detecting the actuator operation.

2. The electronic control unit according to claim 1, wherein the communication section retransmits one frame of the control signal at the timing of detecting the actuator operation.

3. The electronic control unit according to claim 1, wherein the communication section modulates a voltage of a power line and transmits the control signal.

4. An actuator that includes a communication section receiving a control signal and that can receive the control signal from an electronic control unit connected to the actuator via a power line, the actuator comprising an actuator operation detection circuit, wherein when the actuator operation detection circuit detects an actuator operation, the communication section selects and outputs the control signal retransmitted from the electronic control unit on the basis of an actuator operation detection signal, when the actuator operation detection circuit detects the actuator operation, the communication section disables transmission data at timing of detecting the actuator operation, selects retransmission data transmitted by being added to an end of a same communication frame, and outputs the retransmission data.

5. The actuator according to claim 4, wherein
the control signal is a signal for controlling the actuator.

6. The actuator according to claim 4, wherein
the actuator is a solenoid coil, and the operation is a switch operation.

7. An electronic control system comprising: an electronic control unit; one or a plurality of actuators; and a power line that connects the electronic control unit to the one or the plurality of actuators, and transmitting a control signal from the electronic control unit to the one or the plurality of actuators via the power line, wherein a communication section in the electronic control unit includes an actuator operation detection circuit, and retransmits the control signal at timing of detecting an actuator operation when the actuator operation detection circuit detects the actuator operation, and the communication section in each of the one or the plurality of actuators outputs the control signal retransmitted from the electronic control unit, when the actuator operation detection circuit detects the actuator operation, the communication section in the electronic control unit adds a control signal of bits that include a transmission bit at the timing of detecting the actuator operation and either one or a plurality of bits before and after the transmission bit to an end of a same communication frame, and transmits the control signal, and the communication section in the actuator includes an actuator operation detection circuit, and when the actuator operation detection circuit detects the actuator operation, the communication section in the actuator disables the transmission data at the timing of detecting the actuator operation and selects and outputs the control signal retransmitted from the electronic control unit on the basis of an actuator operation detection signal.

8. The electronic control system according to claim 7, wherein the communication section in the electronic control unit retransmits one frame of the control signal at the timing of detecting the actuator operation.

9. The electronic control system according to claim 7, wherein the actuator is a solenoid coil, and the actuator operation is a switch operation.

10. The electronic control system according to claim 7, wherein a sensor having one or a plurality of communication functions is connected to the power line.

11. An automobile using the electronic control system according to claim 7.

* * * * *